(12) United States Patent  
Bala et al.

(10) Patent No.: US 9,421,463 B2  
(45) Date of Patent: Aug. 23, 2016

(54) VIDEO GAME PORTAL

(71) Applicant: Activision Publishing, Inc., Santa Monica, CA (US)

(72) Inventors: Karthik Bala, Menands, NY (US); Lee Guinchard, Mountain View, CA (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 280 days.

(21) Appl. No.: 14/283,887

(22) Filed: May 21, 2014

(65) Prior Publication Data

US 2015/0335998 A1 Nov. 26, 2015

(51) Int. Cl.
  *A63F 9/00* (2006.01)
  *A63F 13/23* (2014.01)
  *A63F 13/98* (2014.01)

(52) U.S. Cl.
  CPC ............... *A63F 13/23* (2014.09); *A63F 13/98* (2014.09)

(58) Field of Classification Search
  CPC .................................. A63F 13/23; A63F 13/98
  See application file for complete search history.

(56) References Cited

U.S. PATENT DOCUMENTS

| | | | | |
|---|---|---|---|---|
| 4,095,791 A | * | 6/1978 | Smith | A63F 13/02 200/6 A |
| 2005/0164789 A1 | * | 7/2005 | Nakamura | A63F 13/12 463/36 |
| 2011/0092294 A1 | * | 4/2011 | Mercier | A63F 13/02 463/46 |
| 2013/0165223 A1 | * | 6/2013 | Leyland | A63F 13/02 463/30 |
| 2013/0341214 A1 | * | 12/2013 | King | A63F 13/02 206/216 |
| 2014/0179446 A1 | * | 6/2014 | Zuniga | A63F 9/24 463/47 |
| 2014/0200085 A1 | * | 7/2014 | Bares | A63F 13/98 463/47 |
| 2014/0274373 A1 | * | 9/2014 | Olshan | G06T 13/40 463/31 |
| 2015/0190720 A1 | * | 7/2015 | Buller | A63F 13/24 463/47 |

* cited by examiner

Primary Examiner — Seng H Lim
(74) Attorney, Agent, or Firm — Klein, O'Neill & Singh, LLP

(57) ABSTRACT

A peripheral device for use in video gameplay includes circuitry for reading information stored in memory of toys placed on the peripheral device, and for providing that information to a computer device upon which gameplay is provided. The peripheral device includes a feature for holding a portable computer device, for example a computer tablet, in a hands free manner during gameplay. The feature may be a notch in the peripheral device, and the notch may be in a protuberance extending from a housing forming the peripheral device. In addition, the housing may provide storage for storing a game controller for use with the video game.

19 Claims, 11 Drawing Sheets

VIDEO GAME PORTAL

BACKGROUND OF THE INVENTION

The present invention relates generally to video games, and more particularly to a peripheral device for video game play with touchscreen enabled portable devices.

Many enjoy play of video games, and do so using a wide variety of computer devices. Video games have long been played using computer devices such as personal computers or video game consoles connected to display devices. In playing video games with personal computers or video game consoles, players often use a personal computer keyboard, or preferably a specialized game controller, to provide user inputs for controlling a video game character or machine of the video game. Whether a keyboard or game controller is used, a plurality of different inputs may be provided, in some cases simultaneously as the player may use both hands to operate controls of the input device.

More recently, video games are being played on a variety of other devices, for example portable computer devices, such as smart phones or computer tablets or "smart" televisions (televisions or set-top boxes with integrated computer functionality, such as internet connectivity or enhanced processing capabilities). Such devices may not have input devices optimal for playing video games. Smart phones and computer tablets, for example, often use a touchscreen as an input device. For video game play, however, use of a touchscreen as the input device may detract from game play in a variety of ways. Operation of the touchscreen may block view of the display during game play. Operation of the touchscreen may also not provide multiple controls, and may not provide a tactile feel perhaps desired by players. In addition, smart phones and computer tablets are often held while in use, restricting a player's ability to simultaneously operate touchscreen controls during gameplay. Similarly, smart televisions often use input devices that are essentially television remote controls. These input devices typically do not have inputs preferable for video game play.

Complicating matters, some games utilize peripheral devices to communicatively link real world objects with the computer device providing gameplay, with the real world objects possibly providing a tangible real world component to game play. The peripheral devices may, for example, read game related information from the real world object, provide that information for use by the computer device during gameplay, and possibly store the same or different game related information in memory of the real world object. The real world objects may be, for example, toys, which may include circuitry for communicating with the peripheral device when in close proximity to that device. Player manipulation of the toys, for example placing them near or taking them away from the peripheral device, may be difficult if the player desires to do so while holding a portable computer device, and possibly also attempting to operate a touchscreen control. Moreover, in some instances the peripheral device may also provide visual and aural accompaniments to game play, accompaniments that may be of lesser effect if close spatial relation between the peripheral device and the portable computer device is not maintained.

BRIEF SUMMARY OF THE INVENTION

Aspects of the invention relate to peripheral devices for video games. One aspect of the invention provides a peripheral device for use in video game gameplay, comprising: a housing having a region for placement of at least one toy; wherein the housing includes a top surface and a bottom surface, the top surface and the bottom surface coupled by at least one side wall, with a storage compartment within a volume, defined by the top surface, at least a portion of the bottom surface, and the at least one sidewall, for storing a game controller; and circuitry within the housing for wireless communication with the at least one toy; the housing including a pair of surfaces for receiving a portion of a portable computer device therebetween.

Another aspect of the invention provides a peripheral device for use in a video game, comprising: a housing circuitry for communication with a computer device and a toy storing information, the housing having a top surface, a bottom surface, the top surface and the bottom surface coupled by a side wall; the housing being substantially cylindrical in shape; the housing having a protuberance in the substantially cylindrical shape, the protuberance extending from the housing between the top surface and the bottom surface; the protuberance having a notch extending through the protuberance, the notch being canted with respect to the top surface of the housing and the bottom surface of the housing, the notch being dimensioned to receive a portion of a tablet computer; and an antenna coupled to the circuitry for communication, the antenna within the housing, the antenna for use in communications with the toy storing information when the toy is placed on the top surface of the housing.

These and other aspects of the invention are more fully comprehended upon review of this disclosure.

DETAILED DESCRIPTION

Figure 1:
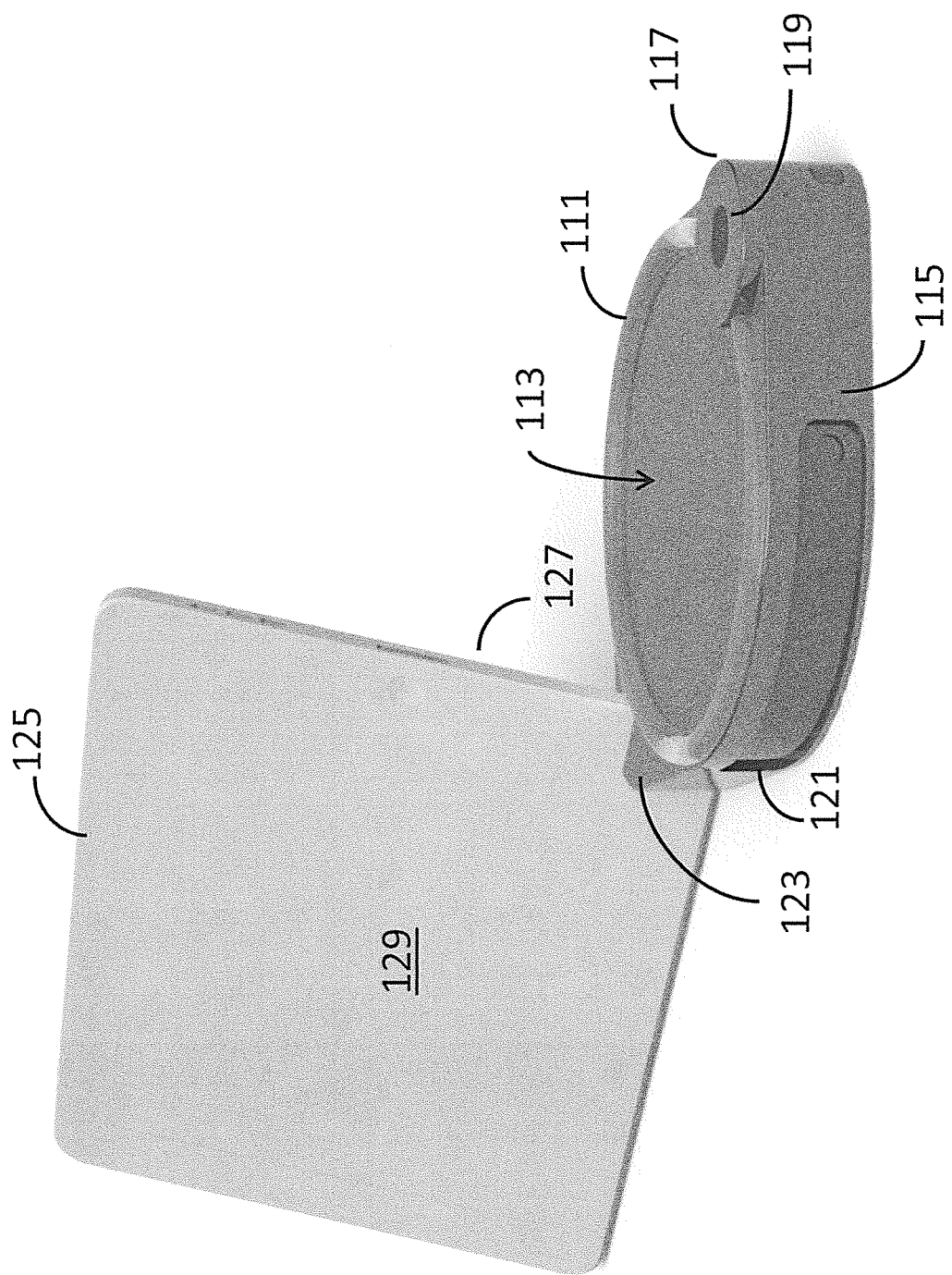
FIG. 1 illustrates a system including a peripheral device in accordance with aspects of the invention and a computer tablet, the peripheral device supporting the computer tablet for use in gameplay.

FIG. 1 illustrates a system including a peripheral device 111 in accordance with aspects of the invention, with the peripheral device supporting a computer tablet 125 having a touchscreen display 129. The peripheral device is useful in playing video games played on the computer tablet, for example video games in which a player controls a video game character representative of a toy placed by the player on the peripheral device. In such video games, the toy may include computer readable information identifying the toy, and possibly characteristics of the video game character representative of the toy, and the peripheral device may read such information and provide the information to the computer tablet, for example by way of wireless communications such as Bluetooth or Bluetooth Low Energy communications, for use in gameplay. In some embodiments characteristics of the video game character may change during gameplay, and the peripheral device may receive the changed information and write the changed information to memory of the toy. In addition, although a computer tablet is illustrated in the system of FIG. 1, in various embodiments other computer devices, for example a smartphone, smart television, or video game console, may be used.

The peripheral device is in the form of a housing including a substantially flat upper surface 113, coupled by a side wall 115 to a bottom surface (not visible in FIG. 1). The upper surface, or top, of the peripheral device generally includes a region for placement of toys used in gameplay. The bottom surface is generally configured for placement on a flat surface, for example a table top or floor, with the bottom surface providing a base for the peripheral device. As illustrated in FIG. 1, the peripheral device is substantially cylindrical in shape, although in various embodiments the peripheral device may have other shapes, for example ring shaped, parallelepiped, have a conical cross-section, or have a hexagonal cross-section, or have a form of a cross, star or other shape, and the housing may have a plurality of side walls.

The peripheral device includes a protuberance 121 along its side, with the protuberance including a notch 123 receiving a portion of the computer tablet, the portion being along a side 127 of the computer tablet as illustrated in FIG. 1. In some embodiments the peripheral device may not include the protuberance, with the notch simply extending into the housing of the peripheral device. Also, in the embodiment of FIG. 1, the notch is canted with respect to a plane perpendicular to the top surface, with for example such a plane intersecting the notch to form an angle of fifteen degrees. In other embodiments the notch may be canted to a greater or lesser extent with the plane perpendicular to the top surface, and in some embodiments the notch may be perpendicular to the top surface.

In some embodiments the protuberance 121 may instead be two protuberances, with the two protuberances forming opposing walls of the notch. In addition, in some embodiments the protuberances may not for a notch, but instead simply provide opposing surfaces, between which the tablet computer may be placed. For example in some embodiments the protuberances may be in the form of a pair of digits, for example cylinders, or also form example tabs, extending from the housing, with the tabs spaced to receive the computer tablet therebetween. The tabs may extend from the housing each at the same height along the side wall of the housing, and spaced apart a distance so as to receive the portion of the computer tablet. Alternatively, the tabs may be at different heights, with for example one tab positioned higher along the housing than another tab, with increased horizontal space between the tabs to allow for canted positioning of the computer tablet.

In some embodiments the protuberance 121 may comprise or be coupled to a clamping mechanism (not shown) to secure the computer tablet therebetween. The clamping mechanism may be adjustable, lockable, and/or spring-loaded to allow for computer tablets of various widths. In some embodiments, the protuberance 121 may comprise padded components (not shown) which both allow for computer tablets of various widths and prevent unintentionally damage to the computer tablet from the protuberance.

In the embodiment of FIG. 1, a plane defined by a surface of the computer tablet, for example the touchscreen display 129, may be considered to generally vertically bisect the peripheral device, ignoring offsets from the vertical provided by the cant. Preferably a radial distance of the cylindrical housing, or corresponding distance if the housing is otherwise shaped, is sufficient such that a moment of inertia of the housing is sufficient to avoid toppling of the computer tablet when positioned in the notch. In this regard, in some embodiments the protuberance and/or the notch may have a position and/or orientation with respect to the housing such that the plane defined by the surface of the computer tablet does not bisect the housing. For example, in some embodiments, the plane defined by the surface of the computer tablet may be, in the view of FIG. 1, forward of a center of the housing. In some embodiments the peripheral device may comprise a counterweight component (not shown) for counterbalancing the weight of the computer tablet. For example, in some embodiments the peripheral may include a discrete counterweight in a portion of the peripheral device that potentially may be tipped up through torque generated by the computer tablet, and in some embodiments the counterweight may be distributed in portions, or throughout, the peripheral device.

In the embodiment of FIG. 1, the peripheral device also includes a second protuberance 117 on an opposite side of the protuberance 121. The second protuberance includes, in its top surface, a cavity 119, or trap, to receive a portion of physical objects, which also may be considered toys. The physical objects may include computer readable, and in some embodiments writable, memory for storing information of game characters.

Figure 2:
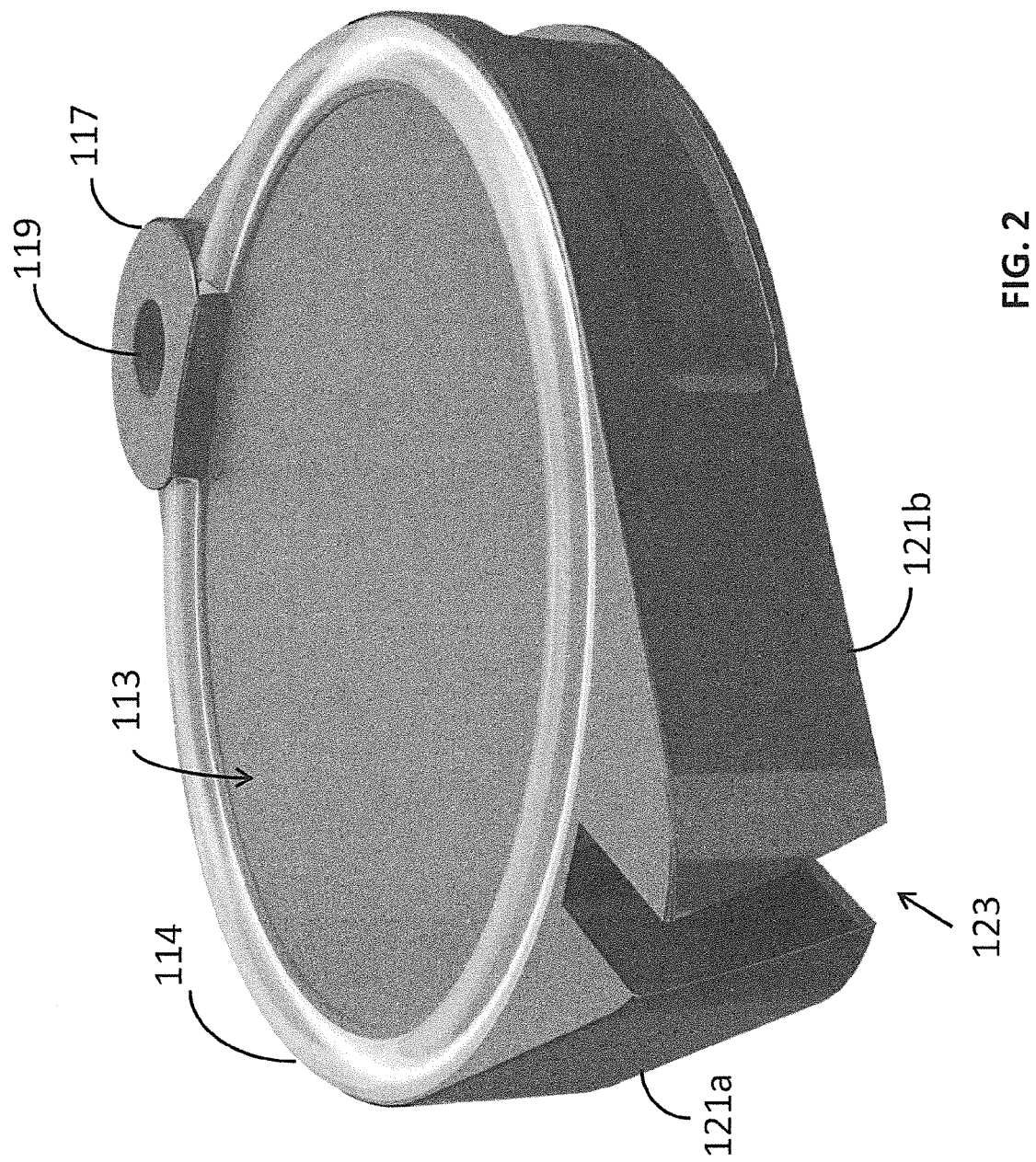
FIG. 2 illustrates a further view of the peripheral device of FIG. 1.

FIG. 2 illustrates a further view of the peripheral device of FIG. 1. As may be seen in FIG. 2, the peripheral device includes the generally flat upper surface 113 for placement of toys during game play. As may be seen in FIG. 2, the upper surface 113 is bounded by a rim 114. In various embodiments the housing of the peripheral device may be generally opaque to light, but with the rim 114, and possibly some other portions, non-opaque to light. For example, in some embodiments the rim may be translucent. Also as may be seen in FIG. 2, the second protuberance 117 includes a raised lip surrounding the trap 119.

More particularly with respect to FIG. 2, it may be seen that the protuberance 121 of FIG. 1 includes a first portion 121a and a second portion 121b, each of which may also be considered separate protuberances. The first and second portions separated by the notch 123. In the embodiment illustrated in FIG. 2, the notch extends into the housing, has generally parallel, and largely vertical, side walls coupled by a largely vertical base, and is canted with respect to a plane perpendicular to the upper surface. A width of the notch is sufficient to receive an edge of the tablet computer, preferably in a snug fashion such that operation of the touchscreen of the tablet computer does not cause excessive movement of the tablet computer, for example movement sufficient to interfere with normal user engagement with the touchscreen.

Figure 3:
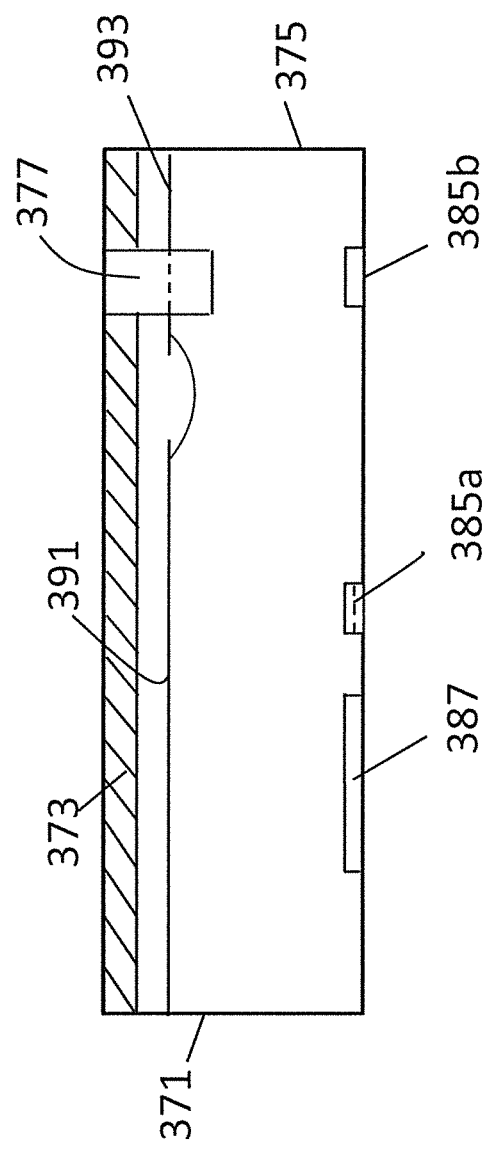
FIG. 3 is a cut-away side view of a peripheral device in accordance with aspects of the invention.

FIG. 3 illustrates a form of a cut-away side view of a peripheral device in accordance with aspects of the invention. The peripheral device includes a first end 371 and a second end 375. Generally a notched portion is provided about the first end, although the notched portion is not visible in FIG. 3. In some embodiments, the peripheral device includes a substantially flat top 373 for placement of toys thereon, with a trap 377 extending inward into the peripheral device from the top 373. As illustrated in FIG. 3, the trap is proximate the second end 375. A first antenna 391 is under, and proximate, the flat top, with the antenna positioned so as to be able to wirelessly communicatively link the peripheral device and toys with appropriate electronics on the flat top. A second antenna 393 is placed about the trap 377, so as to be able to wirelessly communicatively link a game piece, with appropriate electronics, at least partially inserted into the trap, with the peripheral device. The antennas are coupled by wires to a circuit board 387 within the peripheral device. The wires may, for example, be routed along sidewalls of the peripheral device, or alternatively the circuit board may be mounted proximate the flat top (and within the peripheral device). The circuit board provides for communications functions and other functions. In the embodiment of FIG. 3, the second antenna is linked by a wire, or other electrically conducting item, to the first antenna, which in turn is electrically coupled to the circuit board. In other embodiments the reverse is true, and in some embodiments both antennas are individually electrically coupled to the circuit board. In some embodiments, the surface for placing toys may be at the base or a mid-portion of the peripheral. In some embodiments, no surface may be present, and the region for placing toys may be spatially delineated, for example, the area encircled by the sidewalls of the peripheral.

The peripheral device also includes light sources 385a,b, for example LED light sources, within the peripheral device. The light sources may be driven by electronics of the circuit board. In the embodiment of FIG. 3, one light source is shown as positioned under the flat surface, and a second light source is shown positioned under the trap, for example so as to be able to illuminate a lower portion of a game piece within the trap. Accordingly, a bottom surface of the trap is translucent, in some embodiments, or the trap may have no bottom surface at all, allowing for passage of light into the game piece. In some embodiments the top of the peripheral device, or portions thereof, may be translucent to light, allowing for visual effects from the peripheral and/or passage of light to the game piece, even in embodiments in which the bottom of the trap is not translucent. In some embodiments, a speaker for generating audio may also be within the peripheral device. The speaker may be driven, for example, by electronics of the circuit board.

Figure 4:
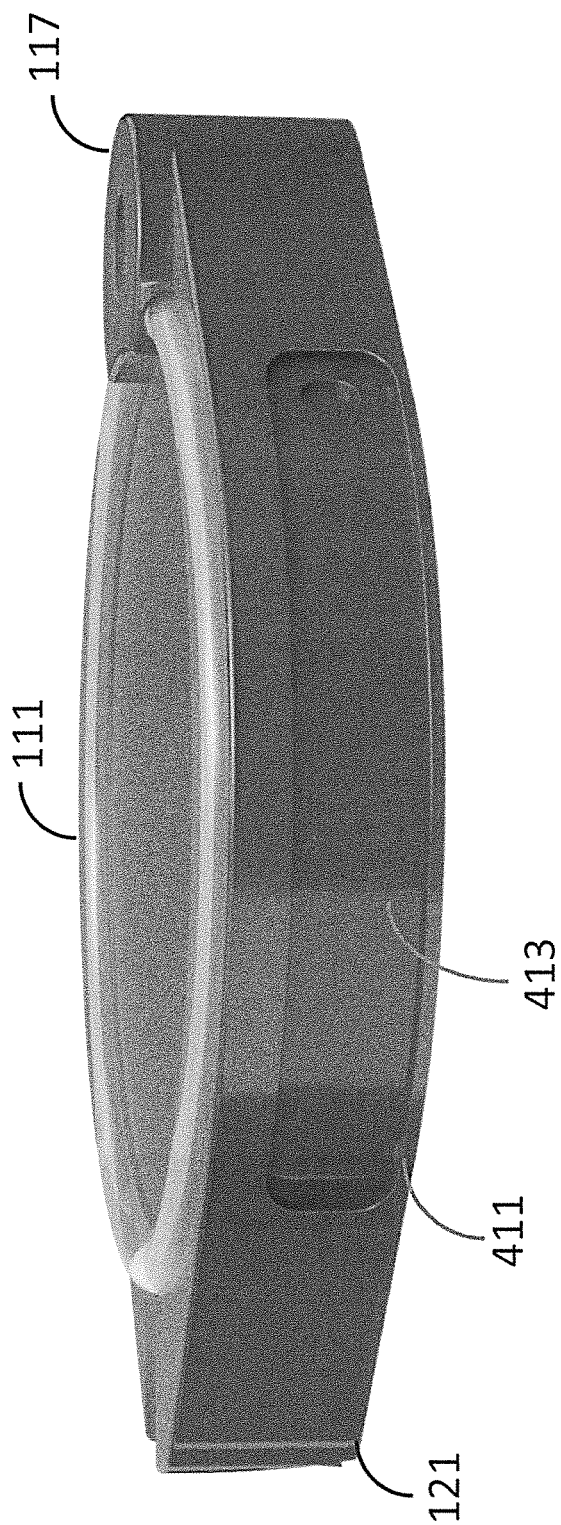
FIG. 4 illustrates a further view of the peripheral device of FIG. 1.

FIG. 4 illustrates a further view of the peripheral device 111 of FIG. 1, with the view of FIG. 4 being what may be considered a semi-front view of the peripheral device. As may be seen in FIG. 4, an aperture 411 is provided in the side wall of the housing of the peripheral device, between the protuberance 121 and the second protuberance 117. A door 413 blocks access to an interior of the housing through the aperture in the side wall. In the embodiment of FIG. 4, the door is shown within the housing, but in various embodiments the door may be flush with the side wall, or exterior to the side wall and aperture.

Figure 5:
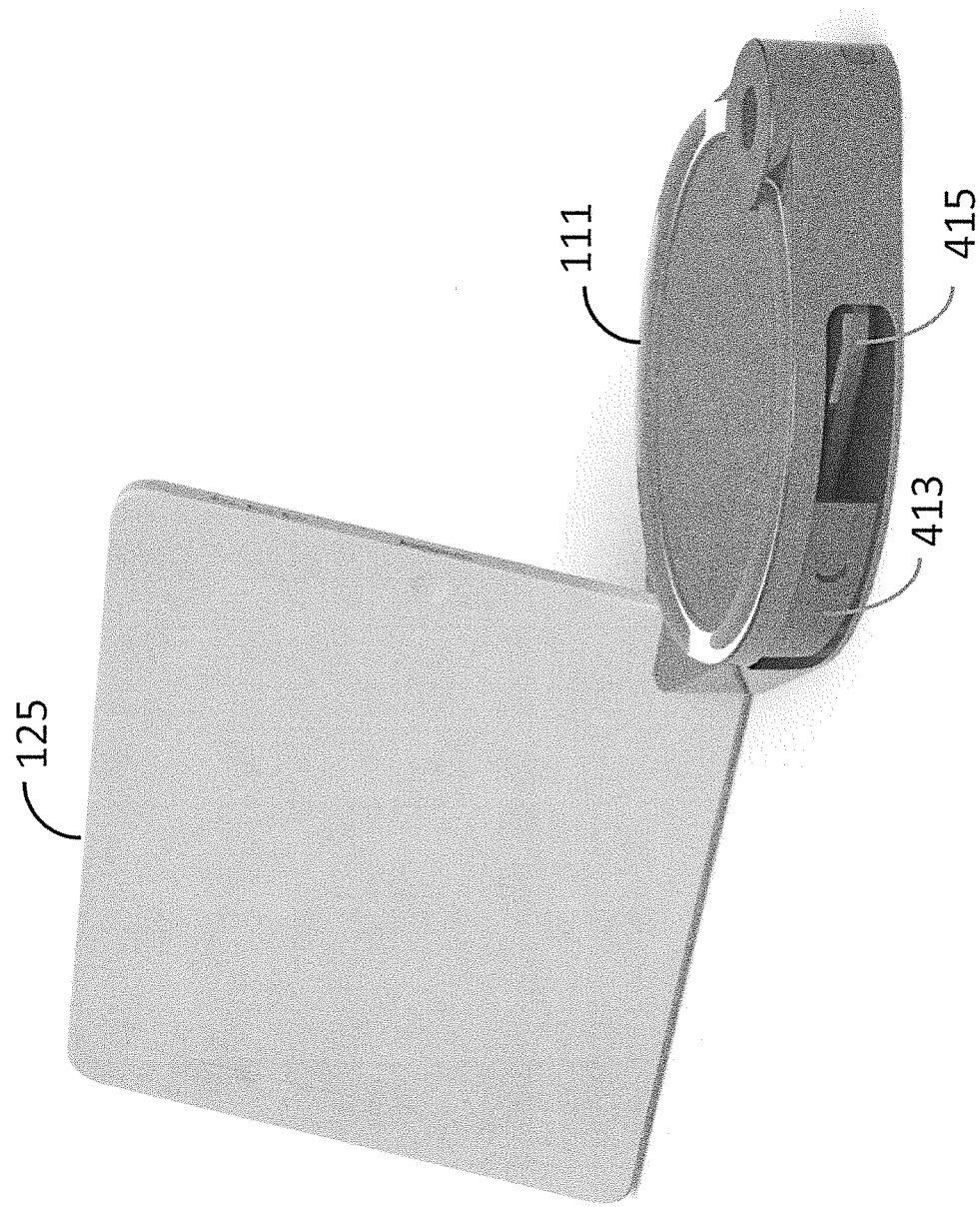
FIG. 5 illustrates the system of FIG. 1, with a door to a storage compartment of the peripheral device partially open, and a game controller stowed within the storage compartment.

FIG. 5 illustrates the peripheral device 111 of FIG. 1, with the tablet computer 125 positioned in the notch, and with the door 413 in a partially open position. With the door in the partially open position, a game controller 415 may be seen as stored within the housing of the peripheral device. The game controller may be so stored, for example, in a storage compartment of the peripheral device, which may be separated by internal walls from circuitry also within the peripheral device. In some embodiments, the peripheral device and the game controller may comprise complementary magnetic elements (e.g., one or more magnets in the peripheral device having corresponding magnets in the game controller arranged so that the magnets in the peripheral device and the magnets in the game controller have opposite polarities facing one another, or one or more magnets in one of the peripheral device and the game controller and one or more non-magnet magnetic elements in the other) such that the game controller is magnetically attached to the peripheral device when stored with the peripheral device's housing. In some embodiments, the peripheral device may comprise a clamping or locking mechanism for retaining the game controller.

Figure 6:
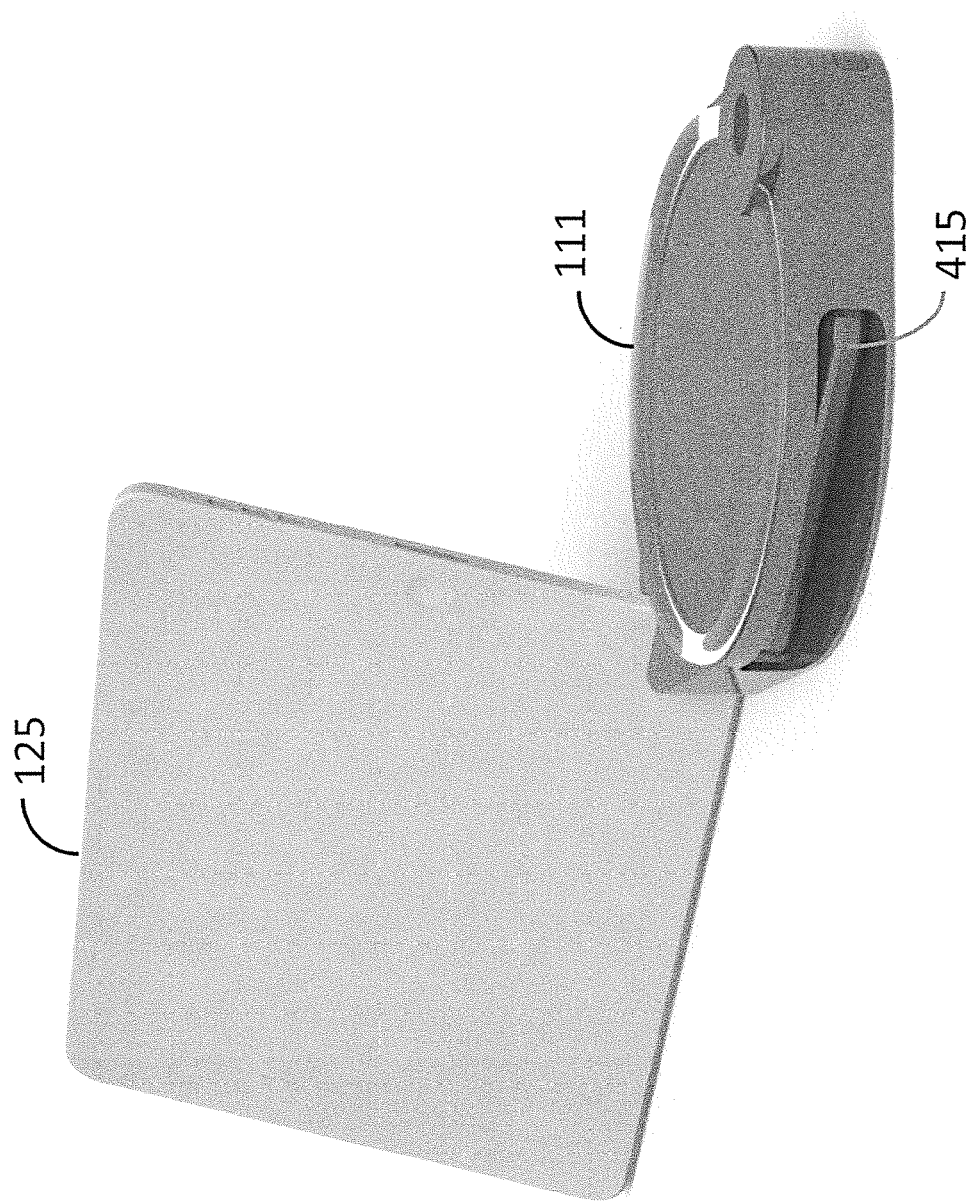
FIG. 6 illustrates the system of FIG. 5, with the door to the storage compartment in an open position.

FIG. 6 illustrates the view of FIG. 5, but with the door in a fully open position. As may be seen in FIG. 6, the computer tablet 125 is positioned in the notch of the peripheral device 111, and the game controller 415 is stored within the peripheral device. The door is not visible in FIG. 6, with the door being a sliding door that slides along the interior of the side wall of the housing. In various embodiments the door instead may be hinged to the side wall, with the door for example opening outward, or the door may be removable from the side wall altogether, with the door normally held in place with clips or the like. In some embodiments, the peripheral device does not comprise a door, and the storage compartment may be left open.

Figure 7:
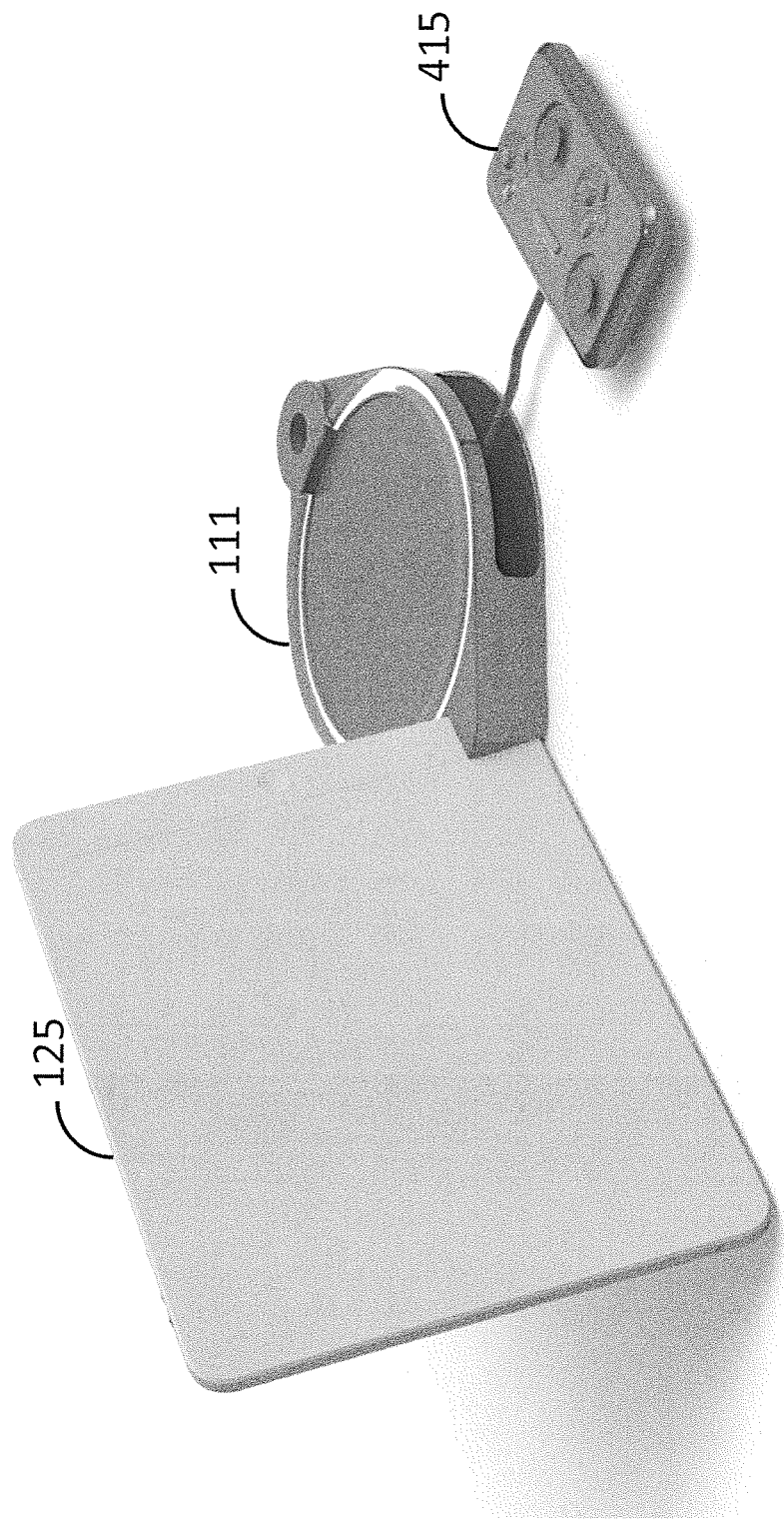
FIG. 7 illustrates the system of FIG. 6, with the game controller removed from the storage compartment.

FIG. 7 also illustrates the game controller 415 removed from the peripheral device 111, ready for use during gameplay. During gameplay a player may control a game character using the game controller, and may do so using both hands, while the tablet computer 125 is held, in a viewable position, in the notch of the peripheral device. Also as illustrated in FIG. 7, the game controller is coupled to the peripheral device by a cord. In some embodiments the cord is simply to securely link the game controller to the peripheral device, to help avoid loss of the game controller. In other embodiments, the cord may include electrical wiring, allowing for electrical communication of signals and/or power between the game controller and the peripheral device. In such embodiments, the peripheral device may communicate game controller signals to the computer device (e.g., tablet, smart phone, smart television, etc.).

Figure 8:
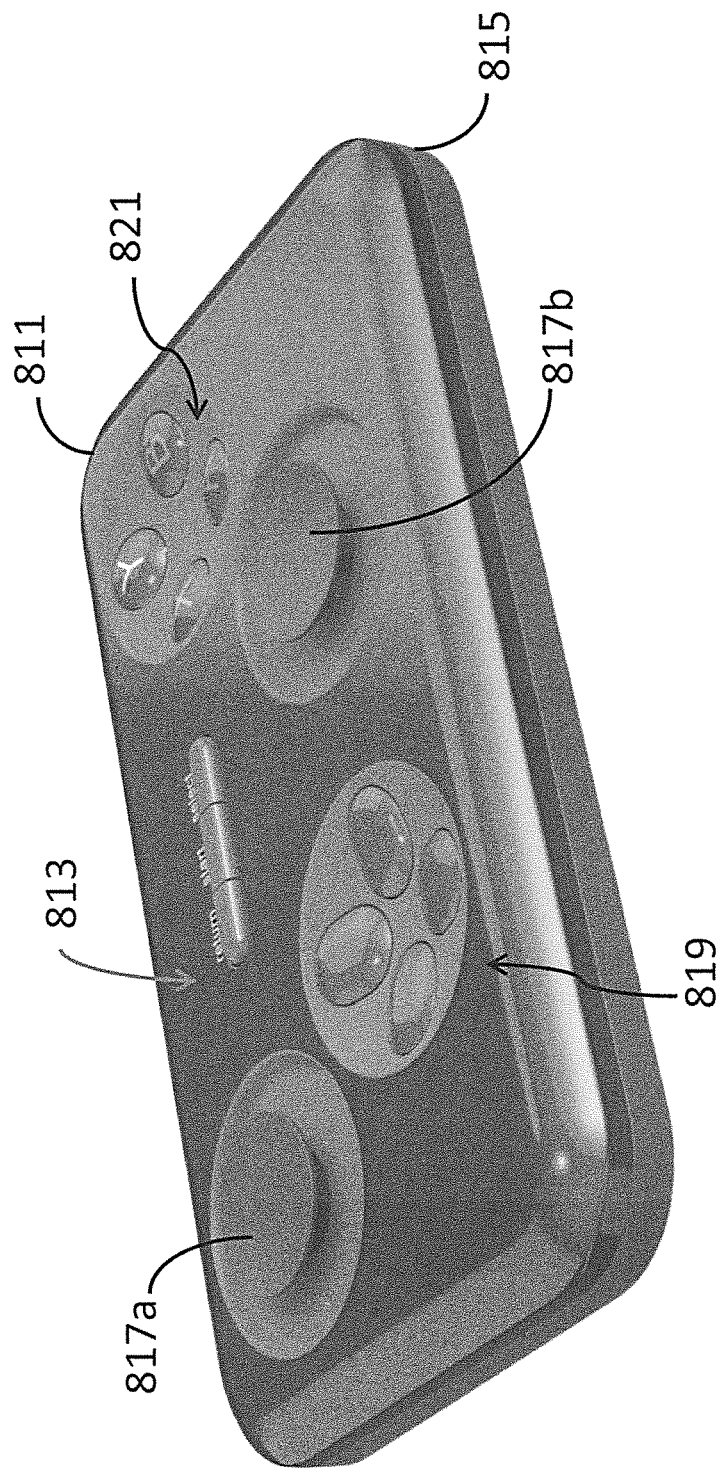
FIG. 8 illustrates an embodiment of a game controller.

FIG. 8 illustrates a top perspective view of a game controller in accordance with, or useful with, aspects of the invention. The game controller includes a base 811. The base is formed of a housing with a top wall 813 and a bottom wall (not visible in FIG. 8) coupled by side walls 815. The game controller is generally dimensioned to fit within a peripheral device, and preferably removable through a doorway or other opening of the peripheral device. In some embodiments the base is substantially dimensioned to be similar in size and shape to a smartphone or other handheld display device. In some embodiments, the game controller comprises magnetic elements (not shown) that pair to magnetic elements within the peripheral device.

A plurality of user input devices extend through the top wall of the base. In the embodiment illustrated in FIG. 8, the input devices include a pair of analog sticks 817a,b, a plurality of game pad buttons 819, and a plurality of directional buttons 821. The input devices are coupled to circuitry within the base. In some embodiments a battery or other power source may be within the base as well. In most embodiments the circuitry within the base communicates information as to the state of the input devices to a computer tablet, smartphone, or other computer device executing a game program. In some embodiments, the game controller includes wireless communication circuitry for communicating with the computer tablet, smartphone, or other computer device, for example using Bluetooth or Bluetooth Low Energy components. In some embodiments the game controller is connected by a wire (not shown in FIG. 8) to the peripheral device. In some embodiments the game controller is tethered to the peripheral device by cord, cable, or the wire. In most embodiments the circuitry within the base communicates information as to the state of the input devices to a computer tablet, smartphone, or other computer device executing a game program.

Figure 9:
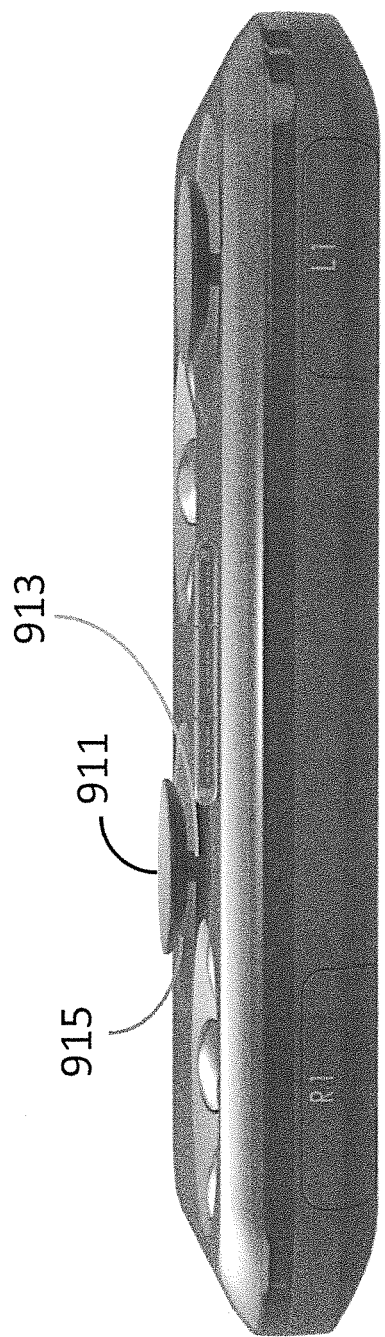
FIG. 9 illustrates a further view of the game controller of FIG. 8.

FIG. 9 illustrates an offset rear view of the game controller of FIG. 8. FIG. 9 shows an embodiment of shape of the analog sticks. For example, for simplicity discussing only analog stick 817*b* of FIG. 8, the analog stick includes a stem 915 extending from the top wall of the game controller to a lower convex surface 915, which is mirrored by an outwardly concave top 911. The concave top of the analog stick possibly may allow for increased user ease in operating the stick, with the shape of the stick as a whole allowing for decreased protrusion of the stick from the top wall of the game controller.

Figure 10:
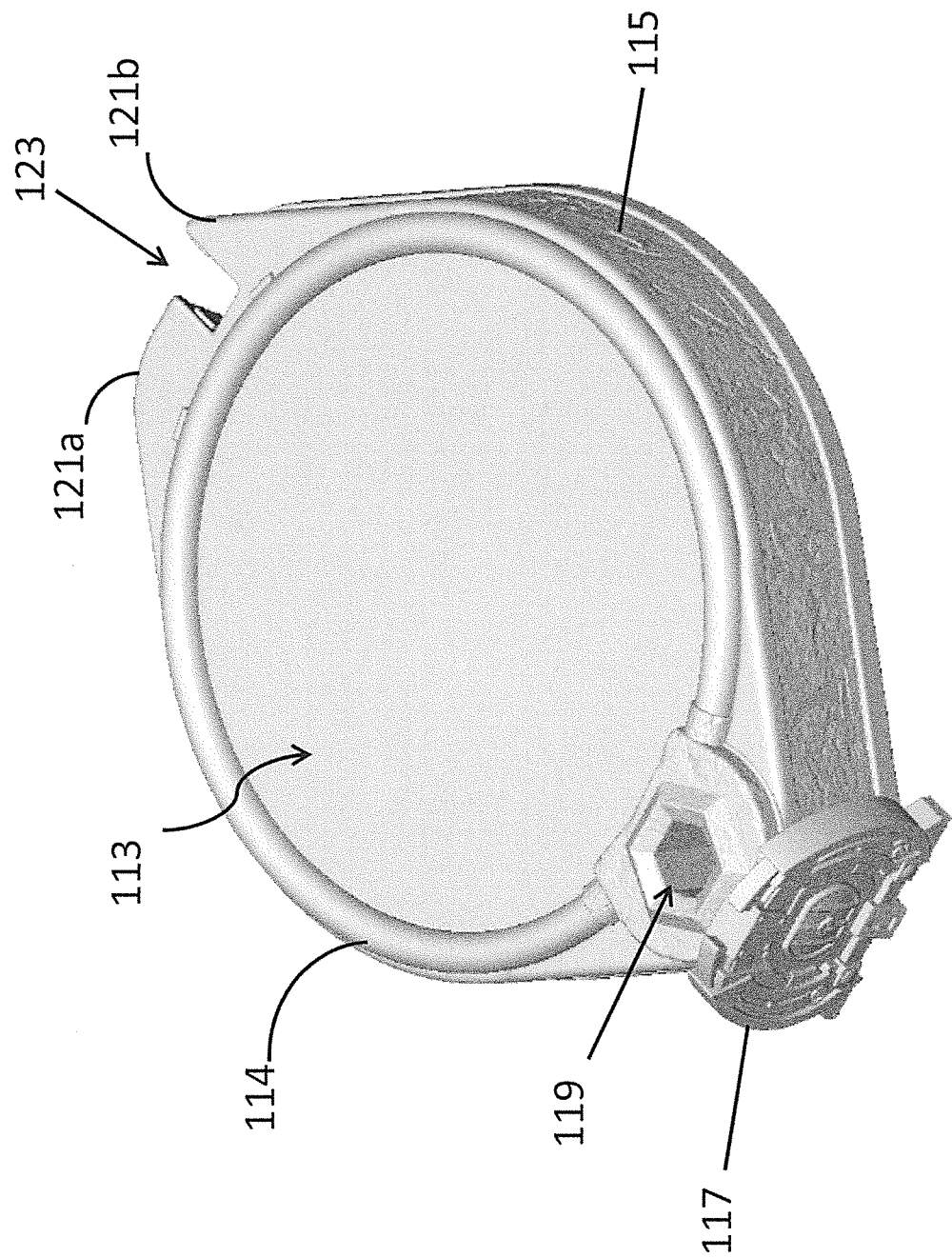
FIG. 10 illustrates a peripheral device in accordance with aspects of the present invention.
Figure 11:
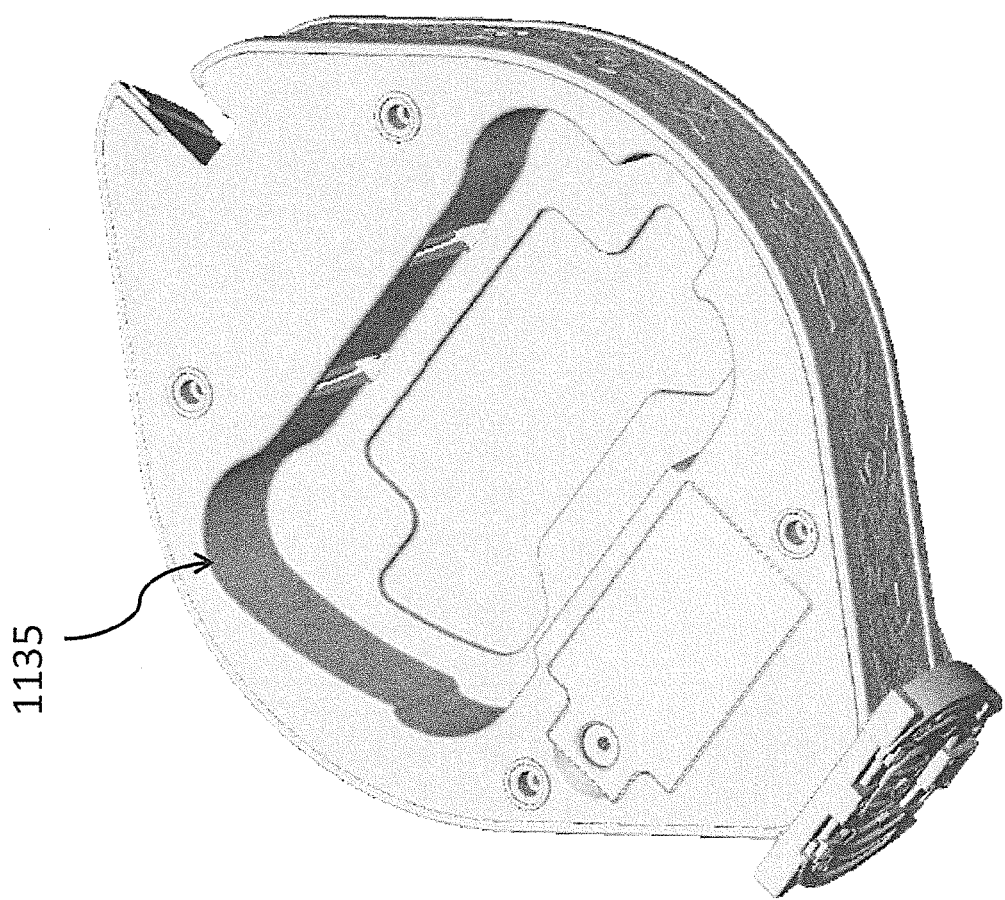
FIG. 11 illustrates a further view of the peripheral device depicted in FIG. 10.

FIGS. 10 and 11 depict another embodiment of the peripheral device disclosed herein. Common elements between the embodiment of FIG. 1 and the embodiment of FIGS. 10 and 11 share the same numerical designations. As shown, the embodiment of FIGS. 10 and 11 does not include an aperture in sidewall 115 for access to the storage compartment. Instead, as shown in FIG. 11, the peripheral device comprises a storage compartment that is accessed through an aperture 1135 in the bottom surface of the peripheral device. As with the embodiment of FIG. 1, the storage compartment may or may not be covered by a door or cover, and in some embodiments the storage compartment may form a cavity in the bottom surface of the housing. Also as with the embodiment of FIG. 1, the peripheral device and/or the game controller may comprise magnetic, clamping, or fastening elements for securing the game controller within the storage compartment of the peripheral device.

Although the invention has been discussed with respect to various embodiments, it should be recognized that the invention comprises the novel and non-obvious claims supported by this disclosure.

What is claimed is:

1. A peripheral device for use in video game gameplay, comprising:
    a housing having a region for placement of at least one toy;
    wherein the housing includes a top surface and a bottom surface, the top surface and the bottom surface coupled by at least one side wall, with a storage compartment within a volume, defined by the top surface, at least a portion of the bottom surface, and the at least one sidewall, for storing a game controller; and
    circuitry within the housing for wireless communication with the at least one toy;
    the housing including a pair of surfaces for receiving a portion of a portable computer device therebetween.

2. The peripheral device of claim 1, wherein the pair of surfaces are opposing surfaces of a notch formed in the housing.

3. The peripheral device of claim 2, wherein the region for placement of at least one toy is on the top surface of the housing, and the notch formed in the housing extends from the top surface of the housing to the bottom surface of the housing.

4. The peripheral device of claim 3, wherein the top surface of the housing is substantially parallel to the bottom surface of the housing, and the notch is canted with respect to a plane perpendicular to a plane defined by the bottom surface of the housing.

5. The peripheral device of claim 1, wherein the storage compartment is accessible by way of an aperture in the bottom surface of the housing.

6. The peripheral device of claim 5, further comprising a door for the aperture in the bottom surface.

7. The peripheral device of claim 1, wherein the game controller is removable from the storage compartment.

8. The peripheral device of claim 1, wherein the storage compartment comprises a first cavity in the bottom surface of the housing.

9. The peripheral device of claim 1, wherein the peripheral device and the game controller comprise complementary magnetic elements.

10. The peripheral device of claim 1, wherein the housing includes a second cavity for receiving a portion of a toy.

11. The peripheral device of claim 1, wherein the housing includes a light source.

12. The peripheral device of claim 1, wherein the housing includes a speaker.

13. The peripheral device of claim 1, wherein the portable computer device is a tablet computer or a smartphone.

14. A peripheral device for use in a video game, comprising:
    a housing circuitry for communication with a computer device and a toy storing information, the housing having a top surface, a bottom surface, the top surface and the bottom surface coupled by a side wall;
    the housing having a protuberance, the protuberance extending from the housing between the top surface and the bottom surface;
    the protuberance having a notch extending through the protuberance, the notch being canted with respect to the top surface of the housing and the bottom surface of the housing, the notch being dimensioned to receive a portion of a tablet computer; and
    an antenna coupled to the circuitry for communication, the antenna within the housing, the antenna for use in communications with the toy storing information when the toy is placed on the top surface of the housing.

15. The peripheral device of claim 14, further comprising a door in a side wall of the housing, the door providing access to a storage compartment within the housing.

16. The peripheral device of claim 15, wherein the storage compartment stores a game controller.

17. The peripheral device of claim 16, further comprising a cavity in the top surface for receiving a portion of a further toy.

18. The peripheral device of claim 17, further comprising a speaker and a light source within the housing, the housing having at least a portion of one surface non-opaque to light.

19. The peripheral device of claim 18, wherein the one surface is the top surface.

* * * * *